Nov. 18, 1924.
S. M. KECK
THUMB SHIELD
Filed April 4, 1924
1,516,385
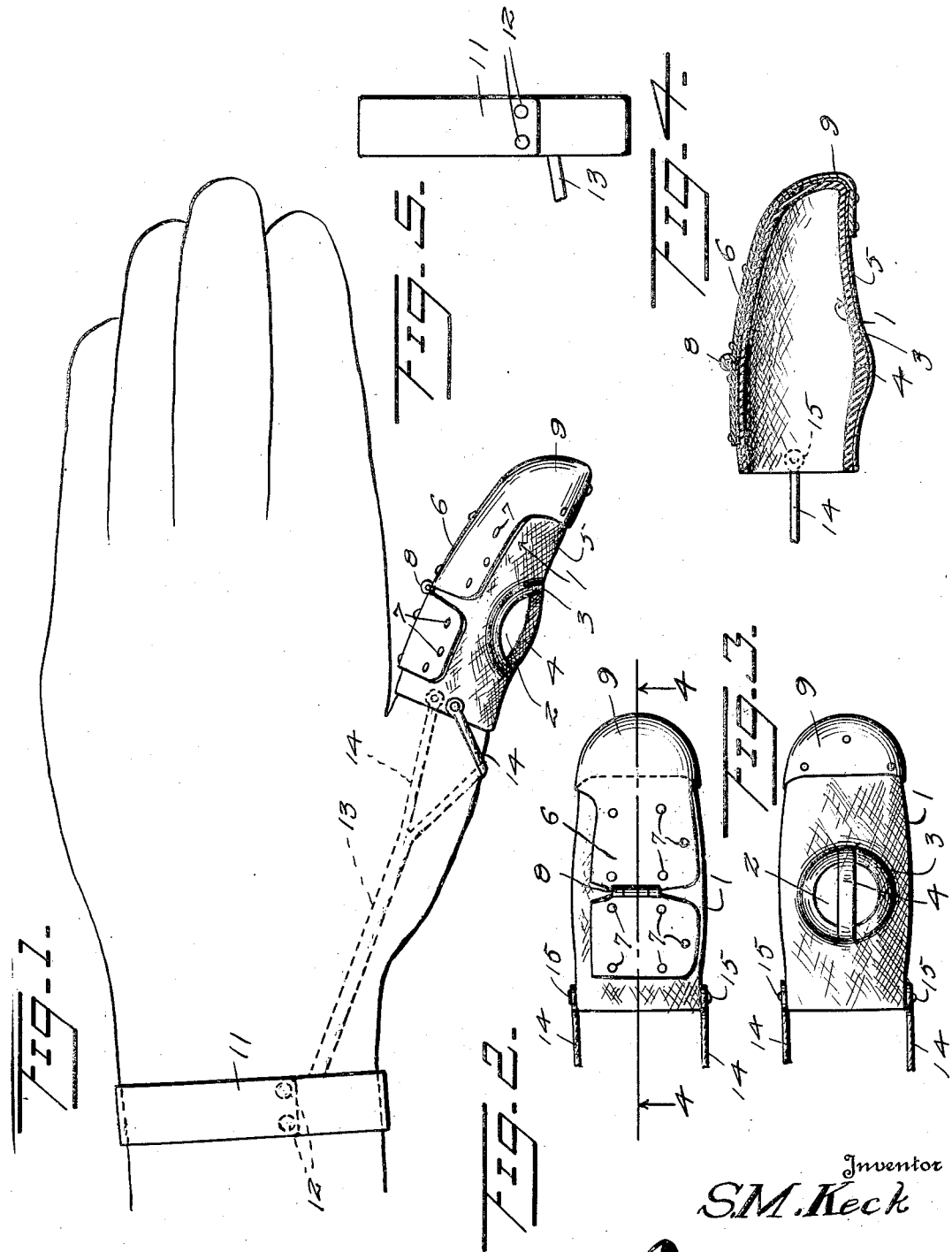

Patented Nov. 18, 1924.

1,516,385

UNITED STATES PATENT OFFICE.

SARAH MARGURETTE KECK, OF FAIRVIEW, WEST VIRGINIA.

THUMB SHIELD.

Application filed April 4, 1924. Serial No. 704,190.

*To all whom it may concern:*

Be it known that I, SARAH M. KECK, a citizen of the United States, residing at Fairview, in the county of Marion and State of West Virginia, have invented certain new and useful Improvements in Thumb Shields; and I do hereby declare the following to be a full, clear, and exact description of the invention, such as will enable others skilled in the art to which it appertains to make and use the same.

This invention relates to thumb shields and has for its primary object the provision of a novel device of this character which shall be especially adapted for use by fruit and vegetable parers to prevent the cutting and abraiding of their thumbs by the paring knife, and which shall not interfere with the free use or flexure of the thumb.

A further object of the invention is the provision of a thumb shield which shall be simple and durable, which may be readily and quickly applied and removed, and which may be manufactured and sold at a comparatively low cost.

With the above and other objects in view, the invention consists in the construction, combination and arrangement of parts hereinafter fully described and claimed, and illustrated in the accompanying drawing, wherein:

Figure 1 is a view illustrating the application of a thumb shield constructed in accordance with my invention, Figure 2 is a detail bottom plan view of the thumb shield, Figure 3 is a detail top plan view of the thumb shield, Figure 4 is a sectional view taken on the plane indicated by the line 4—4 of Figure 2, and Figure 5 is a detail plan view of a portion of the thumb shield attaching means.

The thumb shield comprises a stall 1 which is preferably made of rubber and which is provided in its outer side with an opening 2. The stall 1 is adapted to snugly fit the thumb and when in applied position the opening 2 thereof receives the second joint of the thumb. The opening 2 is preferably of elliptical formation and extends transversely or circumferentially of the stall 1. To prevent the enlargement or distortion of the opening 2, the stall 1 is increased in thickness to provide a reinforcing rib 3 which surrounds the opening, and a strap 4 preferably forming an integral part of the stall, extends transversely across the opening. A reinforcing and portecting cover 5 of any open mesh fabric, preferably cheese cloth, is secured to the outer side of the stall 1 by an adhesive or in any other suitable manner.

A steel plate 6 is secured to the inner side of the stall 1 by rivets 7, and is of sectional formation, and arcuate in cross section. The sections of the plate 6 are connected together at their meeting ends by a hinge 8 which extends transversely of the stall 1 in alinement with the major axis of the opening 2. The plate 6 is provided at its outer end with a hood 9 which extends over the outer end of the stall 1 and to which said end of the stall is secured by rivets 10.

The means by which the shield is secured in applied position comprises a wrist band 11 of any suitable flexible material. The ends of the wrist band 11 are detachably connected together by any suitable fastenings, such as the stud and socket fastenings 12. A flat strap 13 is secured at its inner end to the wrist band 11 and is provided at its outer end with tubular branches 14 which are secured by rivets 15 to the inner end of the shield at the lateral sides of the thumb. The strap 13 may be made of any suitable flexible material.

Due to the formation of the stall 1 of flexible material, the provision of the opening 2 for the reception of the second joint of the thumb, the extension of the hinge 8 transversely of the stall in alinement with the major axis of the opening, and the securing of the branches 14 of the strap 13 to the stall at the lateral sides of the thumb, the shield will not interfere with the free use of the thumb. The plate 6 and its hood 9 prevents the stall 1 from being cut or otherwise damaged by the paring knife.

From the foregoing description, taken in connection with the accompanying drawing, it should be apparent that I have provided a simple, durable and efficient shield for protecting the thumb of a fruit and vegetable cutter from injury, that the shield will not interfere in any way with the free use of the fingers of the hand to which the shield is applied, and that the shield may be readily and quickly applied and removed.

It should be understood that the drawing is merely illustrative and does not pretend to give exact proportions. Furthermore, the said drawing is illustrative of a preferred construction, it being my expectation that various changes and modifications may be made without departing from the spirit and scope of the invention.

What is claimed is:—

1. A thumb shield comprising a flexible stall provided with an opening to receive the second joint of the thumb, the wall of said opening being reinforced, a strip extending across the opening, and a protecting plate secured to the inner side of the stall.

2. A thumb shield comprising a rubber stall provided with a thumb joint receiving opening having its wall reinforced, a strip extending across the opening, a fabric covering for the stall, and a sectional plate secured to the inner side of the stall and provided at its outer end with a hood receiving the outer end of the stall.

3. A thumb shield comprising a flexible stall provided in one of its sides with a joint receiving opening, and a sectional protecting plate secured to the opposite side of the stall with the meeting ends of its sections directly opposite the opening.

In testimony whereof I affix my signature in presence of two witnesses.

SARAH MARGURETTE KECK.

Witnesses:
EMMA WILSON,
OLLIE HEADLEY.